United States Patent
Chang

(10) Patent No.: US 7,605,512 B2
(45) Date of Patent: Oct. 20, 2009

(54) METHOD OF DESIGNING A RELUCTANCE RESOLVER

(75) Inventor: Chia-Ming Chang, Taichung (TW)

(73) Assignee: Hiwin Mikrosystem Corp., Taichung (TW)

(*) Notice: Subject to any disclaimer, the term of this patent is extended or adjusted under 35 U.S.C. 154(b) by 299 days.

(21) Appl. No.: 11/764,218

(22) Filed: Jun. 17, 2007

(65) Prior Publication Data
US 2008/0309278 A1    Dec. 18, 2008

(51) Int. Cl.
*H02K 19/24* (2006.01)
(52) U.S. Cl. .................................... 310/168; 310/68 B
(58) Field of Classification Search ............. 310/168, 310/68 B
See application file for complete search history.

(56) References Cited

U.S. PATENT DOCUMENTS

| | | | | |
|---|---|---|---|---|
| 2,900,612 A | * | 8/1959 | Tripp | 336/123 |
| 3,564,536 A | * | 2/1971 | Hyatt | 341/116 |
| 4,678,971 A | * | 7/1987 | Kanazawa et al. | 318/135 |
| 7,009,389 B2 | * | 3/2006 | Nakano et al. | 324/207.25 |
| 2006/0091755 A1 | * | 5/2006 | Carlisle | 310/168 |

* cited by examiner

*Primary Examiner*—Quyen Leung
*Assistant Examiner*—Jose A Gonzalez Quinones
(74) *Attorney, Agent, or Firm*—Banger Shia

(57) ABSTRACT

A method of designing a reluctance resolver, and the resolver comprises a stator and a rotor, and an exciting coil and two sets of outputting wires wind around the tooth portion of the stator. The designing method comprises the following steps: fixing relative position; calculating the turn ratio of the stator; winding the coil of the stator; and designing the resolver. And the resultant resolver can improve the precision of calculating the position of the motor rotor.

3 Claims, 2 Drawing Sheets

METHOD OF DESIGNING A RELUCTANCE RESOLVER

BACKGROUND OF THE INVENTION

1. Field of the Invention

The present invention relates to a reluctance resolver, and more particularly to a method of designing a reluctance resolver.

2. Description of the Prior Art

Generally, a resolver comprises a rotor and a stator, and its rotor rotates simultaneously with the motor rotor, and then the resolver indicates the angle of the motor rotor. After the angle of the motor rotor is known, the coils of the motor stator can be triggered to allow the magnetic field of the motor stator and that of the motor rotor to be maintained in a vertical position to each other, thus enabling the motor to produce a maximum efficiency.

However, the number of teeth of the stator and the rotator of the conventional resolver should be fixed firstly, and the number of teeth of the stator and the rotator of the conventional resolver is determined preferably based on the resolution. Therefore, in sue, the phase angles of the rotor and the stator are not fixed and must be calculated. Further, the cosine or sine value of the phase angle of each teeth of the rotor and stator is not necessarily an integer number. FIG. 1 shows the waveform displayed on the wave inspector, obviously, it is unable to maintain the correct sine and cosine waves, causing errors in calculating the position of the motor rotor. Nowadays, most of the industries focus on precision technique, and a small error is likely to cause a serious consequence. Therefore, finding a method of precisely calculating the position of the motor rotor is the target of the invention.

SUMMARY OF THE INVENTION

The primary objective of the present invention is to provide a method of designing a reluctance resolver comprising the steps of: Fixing relative position; Calculating the turn ratio of the stator; winding the coil of the stator; and designing the resolver. And the resultant resolver can improve the precision of calculating the position of the motor rotor.

The method of designing a reluctance resolver comprises the detailed steps of:

fixing relative position: determining a teeth number ratio between the stator and the rotor of the resolver, fixing the phase angle of the tooth portion of the stator and the rotor;

calculating the turn ratio of the stator: calculating the turn ratio of the tooth portion of the stator by substituting the phase angle of the stator and the rotor into sine and cosine functions;

winding the coil of the stator: winding the coil around the tooth portion of the stator according to the calculated number of turns of the tooth portion of the stator; and designing resolver: designing the resolver according to the calculated structures of the stator and the rotor of the previous steps.

With such a method, the signal outputted from the resolver will be more accurate, and the precision of the motor rotor position calculated by the resolver will also be improved.

DETAILED DESCRIPTION OF THE PREFERRED EMBODIMENTS

The present invention relates to a method of designing a reluctance resolver, and the resolver comprises a stator and a rotor, and an exciting coil and two sets of outputting wires wind around the tooth portion of the stator. The designing method comprises the following steps:

Fixing relative position: determining the teeth number ratio between the stator and the rotor of the resolver, fixing the phase angle of the tooth portion of the stator and the rotor, the phase angle can be the angle is an integer number, such as 0, 90, 180 or 270 degrees;

Calculating the turn ratio of the stator: calculating the turn ratio of the tooth portion of the stator by substituting the phase angle of the stator and the rotor into sine and cosine functions, and the resultant value by substituting the phase angle of the stator and the rotor into sine and cosine functions is an integer number, the resultant number of turns of the tooth portion of the stator is used as a base number, and the total number of turns of the tooth portion of the stator can be multiple times of this resultant number of turns according to different requirements;

Winding the coil of the stator: winding the coil around the tooth portion of the stator in a straight polarity mode or reversed polarity mode according to the number of turns of the tooth portion of the stator; and Designing the resolver: designing the resolver according to the structures of the stator and the rotor of the previous steps.

Figure 1:
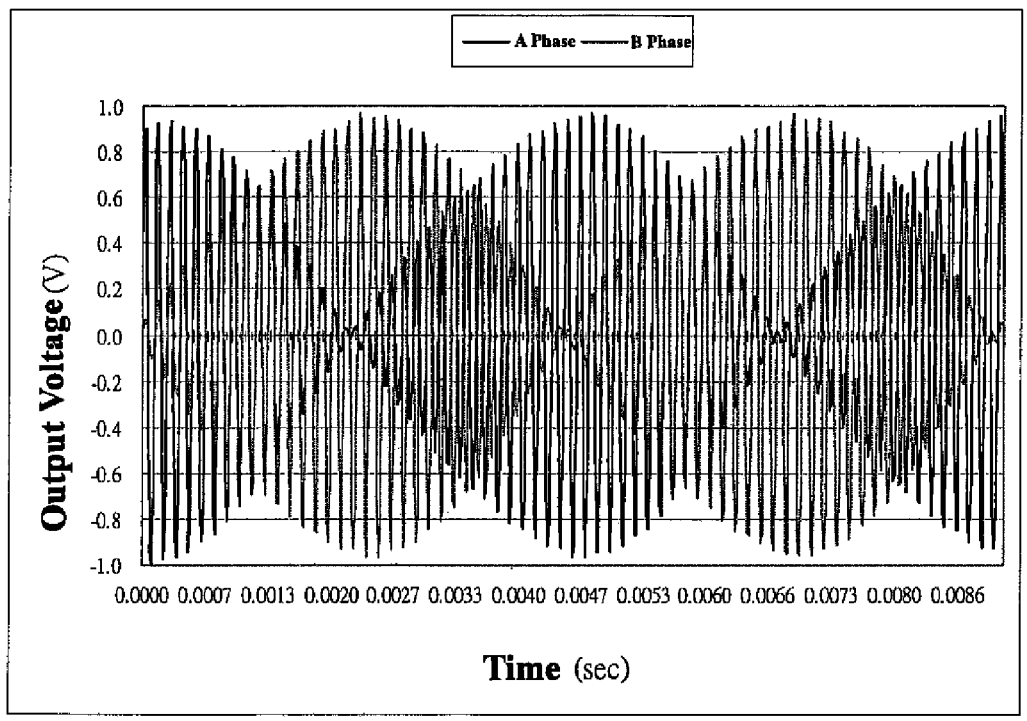
FIG. 1 shows the waveform of the phase angle of a conventional resolver displayed by a waveform inspector.
Figure 2:
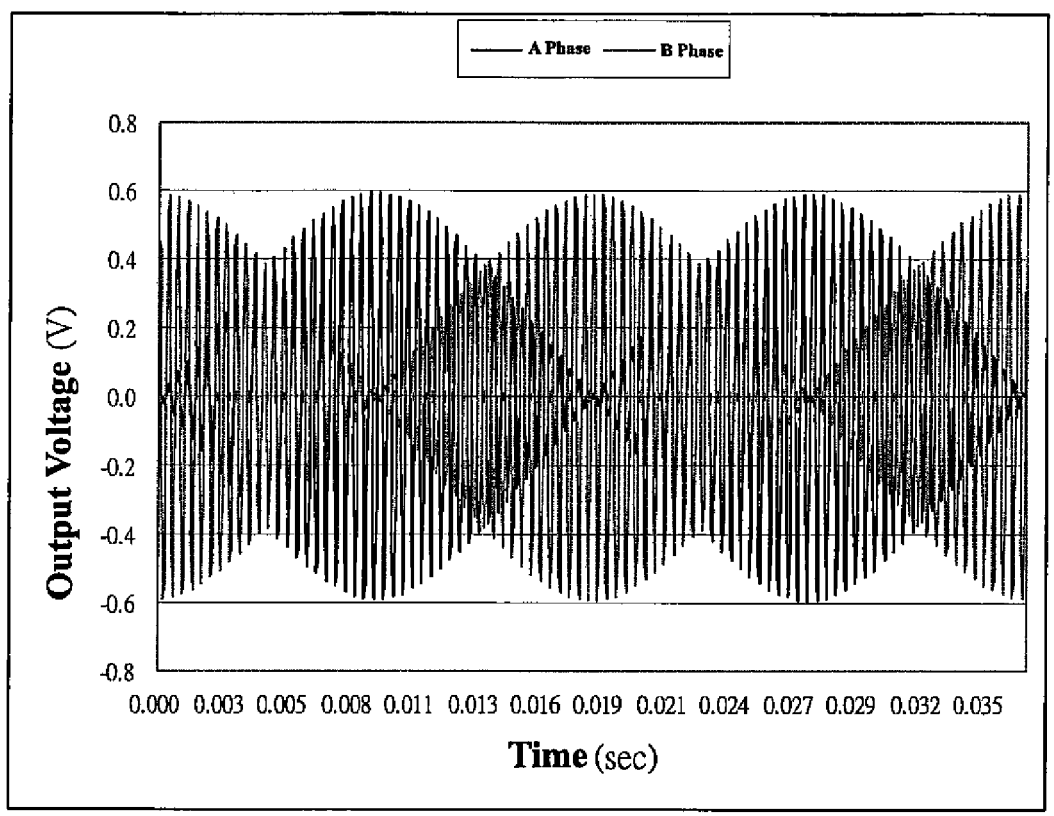
FIG. 2 shows the waveform of the phase angle of a resolver in accordance with the present invention.

Since the phase angles are fixed, the waveform displayed by the waveform inspector as shown in FIG. 2 can present the precise sine and cosine waveforms, so that the signal outputted from the resolver will be more accurate, and the precision of the motor rotor position calculated by the resolver will also be improved. If the method is used in precision control, it must facilitate the upgrading of industrial structure.

To summarize, the present invention relates to a method of designing a reluctance resolver, and the resolver comprises a stator and a rotor, and an exciting coil and two sets of outputting wires wind around the tooth portion of the stator. The designing method comprises the following steps: Fixing relative position; Calculating the turn ratio of the stator; winding the coil of the stator; and designing the resolver. And the resultant resolver can improve the precision of calculating the position of the motor rotor.

While we have shown and described various embodiments in accordance with the present invention, it is clear to those skilled in the art that further embodiments may be made without departing from the scope of the present invention.

What is claimed is:

1. A method of designing a reluctance resolver, the resolver comprising a stator and a rotor, and an exciting coil and two sets of outputting wires wind around the tooth portion of the stator, the designing method comprising the following steps of:

fixing relative position: determining a teeth number ratio between the stator and the rotor of the resolver, fixing the phase angle of the tooth portion of the stator and the rotor;

calculating the turn ratio of the stator: calculating the turn ratio of the tooth portion of the stator by substituting the phase angle of the stator and the rotor into sine and cosine functions;

winding the coil of the stator: winding the coil around the tooth portion of the stator according to the calculated number of turns of the tooth portion of the stator; and designing resolver: designing the resolver according to the calculated structures of the stator and the rotor of the previous steps.

2. The method of designing a reluctance resolver as claimed in claim 1, wherein the resultant value by substituting the phase angle of the stator and the rotor into sine and cosine functions is an integer number.

3. The method of designing a reluctance resolver as claimed in claim 2, wherein the phase angle of the tooth portion of the stator and the rotor is 0, 90, 180 or 270 degrees.

* * * * *